(12) United States Patent
Borcherding et al.

(10) Patent No.: US 7,091,640 B2
(45) Date of Patent: Aug. 15, 2006

(54) MOTOR WITH A MULTIFUNCTION BEARING CAP AND METHOD OF ASSEMBLY

(75) Inventors: Gary W. Borcherding, Florissant, MO (US); Barry M. Newberg, Florissant, MO (US); L. Ranney Dohogne, Creve Coeur, MO (US); Philip S. Johnson, Granite City, IL (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 10/854,477

(22) Filed: May 26, 2004

(65) Prior Publication Data

US 2005/0264116 A1    Dec. 1, 2005

(51) Int. Cl.
*H02K 15/00* (2006.01)
*H02K 5/00* (2006.01)
*H02K 7/08* (2006.01)

(52) U.S. Cl. .......................... 310/90; 310/42; 310/89; 29/596; 29/898

(58) Field of Classification Search ................ 310/42, 310/89, 90; 29/596, 898, 898.07
See application file for complete search history.

(56) References Cited

U.S. PATENT DOCUMENTS

| | | | | |
|---|---|---|---|---|
| 3,998,505 A | * | 12/1976 | Frost et al. .................. 384/510 |
| 4,207,659 A | * | 6/1980 | Rozentals ................. 29/898.07 |
| 4,245,870 A | | 1/1981 | Punshon et al. ............... 308/36 |
| 4,348,791 A | * | 9/1982 | Tomson ........................ 29/598 |
| 4,362,342 A | * | 12/1982 | Bushor et al. ............... 384/192 |
| 4,523,118 A | * | 6/1985 | Cunningham ................. 310/90 |
| 5,203,070 A | * | 4/1993 | Montgomery et al. ........ 29/596 |
| 5,313,703 A | * | 5/1994 | Shimmell ................ 29/890.12 |
| 5,710,468 A | * | 1/1998 | Church et al. ................ 310/90 |
| 5,758,404 A | * | 6/1998 | Baumann et al. ............. 29/598 |
| 5,767,596 A | * | 6/1998 | Stark et al. ................... 310/89 |
| 6,247,223 B1 | * | 6/2001 | Keck ............................ 29/596 |
| 6,415,191 B1 | * | 7/2002 | Pryor .......................... 700/95 |
| 6,531,794 B1 | * | 3/2003 | Brahmavar et al. ........... 310/42 |

OTHER PUBLICATIONS

Anwar, M.N. et al., "Effects of End-Shields on the Stator Mode Frequencies of Electric Machines", Industry Applications Conference, 2001. 36th IAS Annual Meeting, Conference Record of the 2001 IEEE vol. 1, Sep.30-Oct. 4, 2001 pp. 26-32 vol. 1.*
*Motor Characteristics*, Electrician's Toolbox Etc., 2004, See http://www.elec-toolbox.com/motorchar.htm.

* cited by examiner

*Primary Examiner*—Burton Mullins
(74) *Attorney, Agent, or Firm*—Harness, Dickey & Pierce

(57) ABSTRACT

A motor and method of assembly of a motor having a stator core and at least a first end shield. The method includes selecting a bearing cap from one of a plurality of bearing caps. Each of the plurality of bearing caps has a different bearing cap length and is dimensioned for attachment to the first end shield. The bearing cap is selected from the plurality of bearing caps as a function of a width of the stator core. The invention is also a motor system that includes a stator core selected from a plurality of stator cores and a bearing cap selected from a plurality of bearing caps. Each of the plurality of stator cores has a different stator core width and each of the plurality of bearing caps has a different bearing cap length. The bearing cap is selected as a function of a width of the selected stator core.

14 Claims, 5 Drawing Sheets

MOTOR WITH A MULTIFUNCTION BEARING CAP AND METHOD OF ASSEMBLY

FIELD OF THE INVENTION

The present invention relates to an electric motor and a method of assembling of the electric motor.

BACKGROUND OF THE INVENTION

A motor is often used in a consumer, commercial or industrial devices or systems requiring motor control or power. As just one example, a washing machine utilizes a motor for rotation of the washing tub. In such systems, a manufacturer of the system often designs the system or device and provides the specification requirements for the motor including the mounting arrangements. Such mounting arrangement specifications often include one or more mounting attachments for the motor and may include an attachment arrangement such as a mounting hub ring. Additionally, such motor system specifications may also include a distance or total length between two or more mounting attachments or hub rings. In some applications, the application specification specifies the type of hub ring attachment at each of the two opposing ends of the motor and a total hub-to-hub length.

A motor for use in such a system should comply with the system specifications including the power and torque requirements and the attachment specifications. However, while the motor must provide the required power and torque requirements and must be compatible with the physical attachment specifications, the manufacturer of the motor may vary the design of the motor. Such variations may be a result of changing motor technology, changes to the system power and torque requirements, or may be due to other motor manufacturer required or desired changes. For example, the width of the stator core of the motor may be different due to a need for increased or reduced power or torque or due to an increase in motor efficiency.

Additionally, each system manufacture or each application of the manufacture may have a different mounting arrangement and/or a different specified hub-to-hub length.

In these cases, often motor manufacturers have utilized end shields with varying lengths to adapt the total hub-to-hub length of the motor to account for varying stator core widths or hub-to-hub lengths. However, the requirement to design, manufacture, inventory, and assemble a variety of different length end shields to a variety of different length stator cores is administratively and operationally complex, and increases both the administrative and assembly cost of the motor.

As such, the inventors herein have recognized that it would be desirable for a motor to be adaptable to varying applications and mounting arrangements. The inventors recognize that it would be desirable for a motor to utilize a standard length end shield but having a predetermined hub-to-hub length that is independent of the selection of one of a variety of stator cores having various stator core widths. Additionally, it would be desirable for a motor to be adaptable to a variety of hub-to-hub lengths utilizing the standard length end shield so that the motor may be utilized in two or more systems or applications requiring two or more hub-to-hub lengths.

SUMMARY

A motor system according to one aspect of the invention includes a method of producing a motor having a stator core and at least a first end shield. The method includes selecting a bearing cap from one of a plurality of bearing caps. Each of the plurality of bearing caps has a different bearing cap length and is dimensioned for attachment to the first end shield. The bearing cap is selected from the plurality of bearing caps as a function of a width of the stator core.

In another aspect, the invention includes an electric motor having a stator core and at least a first end shield. The motor is produced according to a method that includes selecting a stator core from one of a plurality of stator cores each of which has a different stator core width. The method also includes selecting a bearing cap from one of a plurality of bearing caps. Each of the plurality of bearing caps has a different bearing cap length and is dimensioned for attachment to the first end shield. The bearing cap is selected as a function of a width of the selected stator core.

In yet another aspect, the invention includes a method of assembling a motor that includes selecting a stator core from one of a plurality of stator cores. Each of the plurality of stator cores has a different stator core width. The method also includes attaching a first end shield and a second end shield to opposing sides of the selected stator core. The method further includes selecting a first and a second bearing cap from a plurality of bearing caps. Each of the plurality of bearing caps has a different bearing cap length and is dimensioned for attachment to the first and second end shields. The selection of at least one of the first and the second bearing caps is a function of a width of the selected stator core. The method further includes attaching the first bearing cap to the first end shield and the second bearing cap to the second end shield to provide the motor with a predetermined hub-to-hub length.

In still another aspect, the invention includes a motor system that includes a stator core selected from a plurality of stator cores and a bearing cap selected from a plurality of bearing caps. Each of the plurality of stator cores has a different stator core width and each of the plurality of bearing caps has a different bearing cap length. The bearing cap is selected as a function of a width of the selected stator core.

Further aspects and features of the invention will be in part apparent and in part pointed out in the detailed description provided hereinafter. It should be understood that the detailed description and specific examples, while indicating various embodiments of the invention, are intended for purposes of illustration only and are not intended to limit the scope of the invention.

BRIEF DESCRIPTION OF THE DRAWINGS

The present invention will become more fully understood from the detailed description and the accompanying drawings.

Corresponding reference characters indicate corresponding parts throughout the several views of the drawings.

DETAILED DESCRIPTION OF EXEMPLARY EMBODIMENTS

The following description is merely exemplary in nature and is in no way intended to limit the invention, its application, or uses.

In one embodiment, a motor system has a stator core selected from a plurality of stator cores. The motor system has a hub-to-hub length that is the length from one hub mounting position at a first end of the motor and a second hub mounting position at a second end of the motor. Each of the plurality of stator cores has a different stator core width. The stator core width is the distance between a first stator core end and a second stator core end. In the motor system, the stator core width is a portion of the motor's hub-to-hub length. A bearing cap is selected from a plurality of bearing caps. Each of the plurality of bearing caps has a different bearing cap length. The bearing cap length is a portion of the motor's hub-to-hub length. The bearing cap is selected as a function of a selected stator core width and the bearing cap length. The bearing cap may be configured to couple to a hub ring for mounting a portion of the motor. The motor may also have one or more end shields. When assembled, the hub-to-hub length of the motor is in part a function of the width of the stator, the length of the one or more end shields, and the length of one or more end caps.

Figure 1:
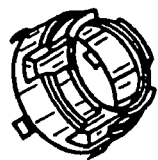
FIG. 1 is a full three-dimensional view of a bearing cap according to one embodiment of the invention
Figure 2:
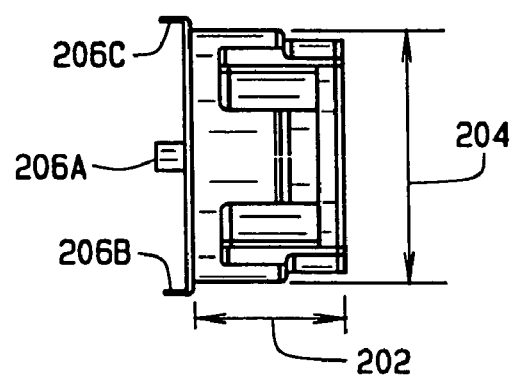
FIG. 2 is a first side view of a bearing cap having a first hub length according to one embodiment of the invention
Figure 3:
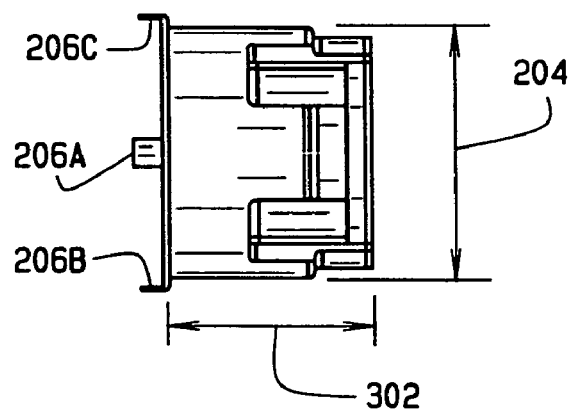
FIG. 3 is a second side view of a bearing cap having a second hub length according to a second embodiment of the invention

An example of one embodiment of a bearing cap from among the plurality of bearing caps according to one embodiment of the invention is illustrated in FIG. 1. Additionally, bearing caps illustrative of the plurality of bearing caps having different bearing cap lengths are illustrated in FIGS. 2 and 3. In FIG. 2, a first bearing cap 200 has a first bearing cap length 202 and a bearing cap radial dimension 204. First bearing cap 200 may also include one or more tabs or attachment couplers as illustrated as 206 A–C. Second bearing cap 300 as illustrated in FIG. 3 is also one of the plurality of bearing caps that is similar in design and radial dimension 204. Second bearing cap 300 also includes tabs or attachment couplers 206 A–C. Second bearing cap 300 is similar, compatible to, and interchangeable with first bearing cap. The only difference between first bearing 200 and second bearing cap 300 is the length of the bearing caps. In this example, second bearing cap length 302 is different than first bearing cap length 202 and is illustrated generally to have a greater length. The plurality of bearing caps may contain additional bearing caps in addition to those illustrated as first bearing cap 200 and second bearing cap 300.

Figure 4:
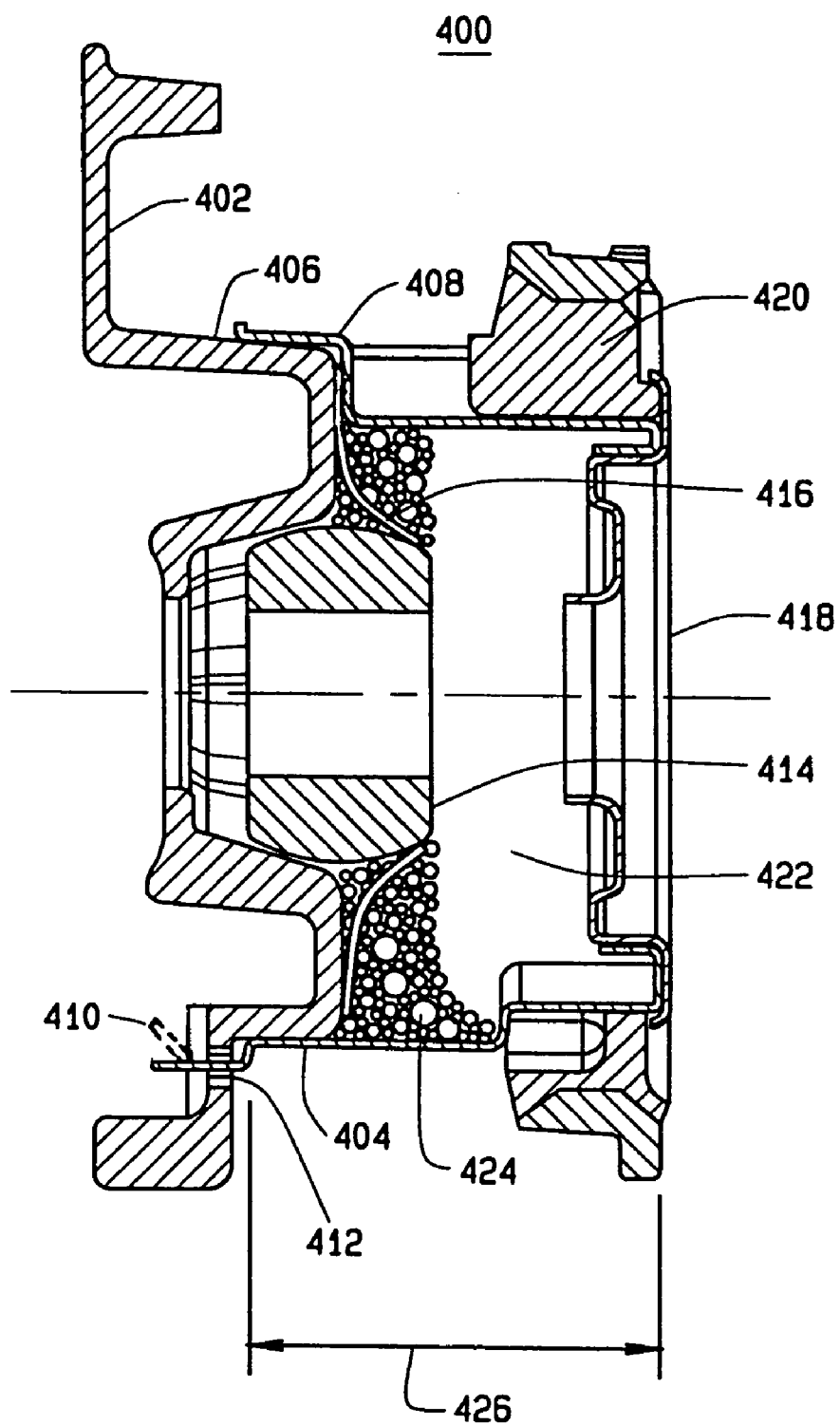
FIG. 4 is a first partial cross-sectional view of a motor having a bearing cap according to one embodiment of the invention.

Referring now to FIG. 4, a motor assembly 400 according to one exemplary embodiment includes an end shield 402 and a bearing cap 404. End shield 402 and bearing cap 404 may be configured for coupling one to the other. Bearing cap 404 may have one or more configurations that may couple to a portion of end shield 402. Such coupling may be by any means and may include press fitting, gluing, welding, soldering, screwing, bending, twisting, etc. For example, as illustrated a bearing cap inner edge 408 may be configured for coupling to an end shield outer surface 406. As another example, bearing cap 404 may have one or more tabs 410 which may be configured for coupling a portion of end shield 402. As shown, end shield 404 may include a tab slot or flange or edge such as 412 for engaging bearing cap tab 410. Such engaging of tab 410 may include bending (as illustrated), twisting, soldering, gluing, and welding.

Bearing cap 404 has a bearing cap length 426. Bearing cap 404 is selected from a plurality of bearing caps 404, each of which has a different bearing cap length 426. A particular bearing 404 from the plurality of bearing caps 404 that are attachable to end shield 402 is selected as a function of a length of a stator core (not shown).

Motor assembly 400 may also include a bearing 414 that may be enclosed in whole or in part within an inner chamber of bearing cap 404. Bearing 414 may be any type of bearing including, but not limited to Babbitt bearings, powder metal bearings, ball bearings, white metal bearings, tri-metal bearings, bi-metal bearings, thrust bearings, and roller bearings. Such bearing may also be self aligning and about a shaft (not shown) of the motor assembly 400. Motor assembly 400 may also include a bearing retainer 416 for retaining bearing 414. As illustrated, bearing retainer 416 may be positioned within bearing cap 404 for engaging bearing 414. For example, bearing retainer 416 may be configured for positioning within bearing cap 404 such that when bearing cap 404 is coupled to end shield 402, bearing retainer 416 is positioned between bearing cap 404 and end shield 402. Bearing retainer 416 may also be configured to couple to bearing 414 such that bearing 414 is held in fixed or movable position under a stress force by bearing retainer 414.

Motor assembly 400 may also include a bearing cap cover 418 that may be coupled to a bearing cap 404. When coupled to bearing cap 404, bearing cap cover 418 may enclose an inner chamber 422 within bearing cap 404. Additionally, bearing cap cover 418 may be configured to encase or retain a bearing lubricant 424 within inner chamber 422 and in proximity to bearing 414.

Bearing cap 404 may be configured to engage a hub assembly or other motor mounting arrangement. For example, as illustrated a hub ring 420 may be coupled to bearing cap 404. In one embodiment, hub ring 420, bearing cap 404 and bearing cap cover 418 are configured such that when bearing cap cover 418 is coupled to bearing cap 404, bearing cap cover 418 secures or engages, at least in part, hub ring 420 to bearing cap 404.

Figure 5:
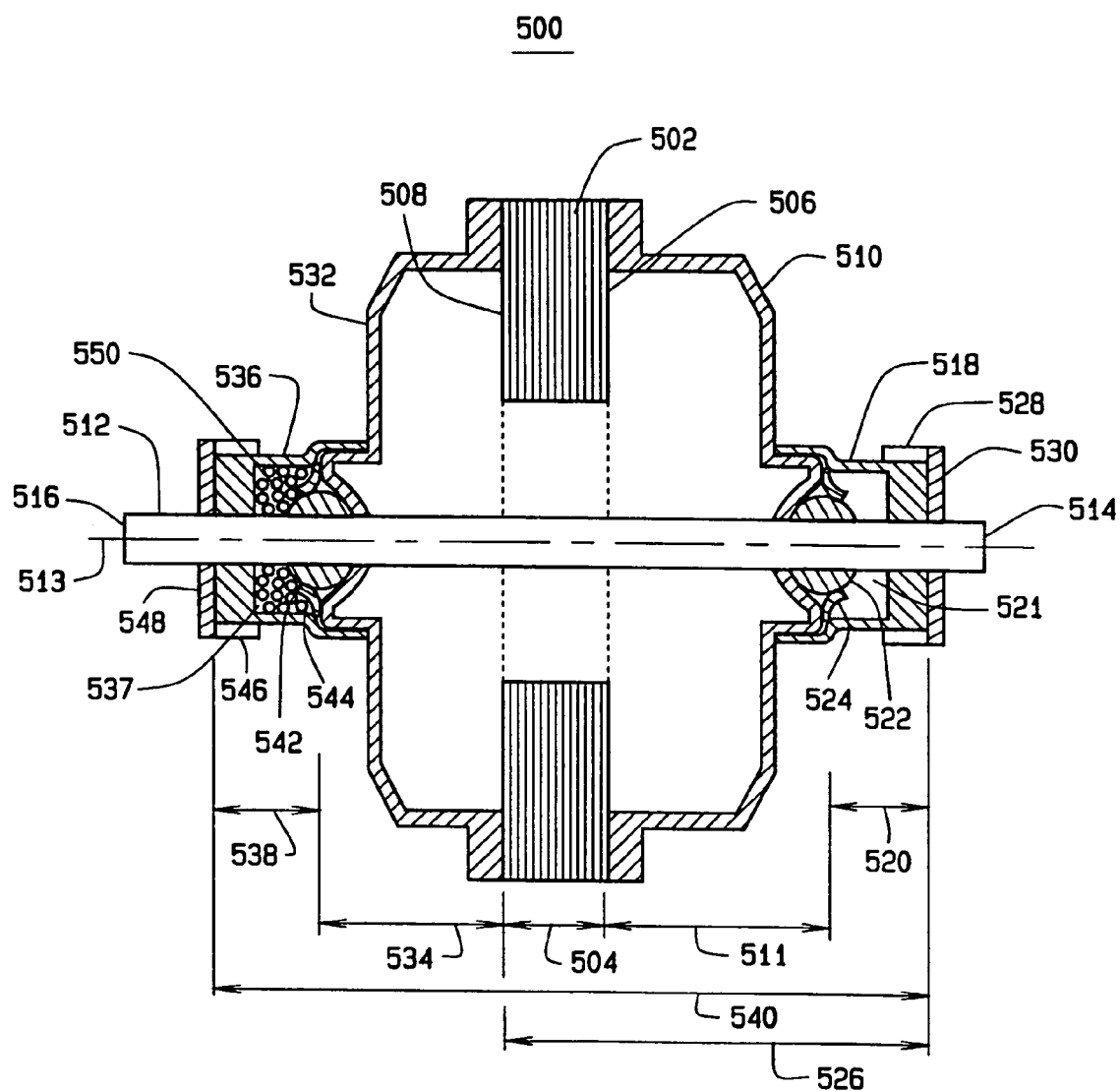
FIG. 5 is a second partial cross-sectional view of a motor having a bearing cap according to another embodiment of the invention.

In FIG. 5, a motor assembly 500 illustrates another embodiment of a motor assembly according to the invention. As illustrated, motor assembly 500 includes a stator core 502 having a stator core width 504 that is about the length between a first stator core surface 506 and a second stator core surface 508. In various embodiments, stator core width 504 is different depending on various factors including the power and/or torque requirements of motor assembly 500. An end shield 510 is coupled to the first stator core surface 506 by any known method or system of coupling including glue, staple, bolt, and screw (not shown). End shield 510 has an end shield length 511. Stator core 502 and end shield 510 are about a shaft 512. Shaft 512 is rotatable about a shaft center axis 513 and has a first shaft end 514 and a second shaft end 516. A bearing cap 518 is coupled to end shield 510 and about shaft 512. As discussed about, bearing cap 518 and end shield 510 may be configured for any form of coupling including press fitting (as illustrated), gluing, bolting, screwing, pining, welding, tabbing, stapling, nailing and threading (not shown). Bearing cap 518 has a bearing cap length 520 and an inner chamber 521.

A bearing 522 may be located within the inner chamber 521 and about shaft 512. A sleeve bearing is illustrated in FIG. 5, but those skilled in the art understand that bearing 522 could be any type of bearing. A bearing retainer 524 may be located within bearing cap 518 to retain or bias bearing 522. In one embodiment, bearing retainer 524 is configured to be press fit under tension between the coupled bearing cap 518 and end shield 510. In this case, when press fit under tension bearing retainer 524 may bias or secure bearing 522 about shaft 512 and within bearing cap inner chamber 521.

When assembled, a length of the partial motor assembly of stator core 502, end shield 510, and bearing cap 518, has an assembled partial length 526 of stator core width 504, end shield length 511, and bearing cap length 520. In other embodiments, other motor components may also be included into the determination of the length of the assembled motor. In this example arrangement and as noted above, the motor is assembled by selecting a particular stator core from among a plurality of stator cores 502 having different stator widths 504. In such a case, a particular bearing cap is selected from among a plurality of bearing caps 518 each having a different bearing cap length 520.

In one application of motor assembly 500, the partial motor assembly length 526 is predefined. As such, when a particular stator core 502 having a particular stator core width 504 is selected for assembly in motor assembly 500, a particular bearing cap 518 having a particular bearing cap length 520 must be selected so that the sum of the lengths of the various components equals the partial motor assembly length 526. As in one preferred embodiment, end shield 510 is common to all motor assembly 500 applications and has a standard or non-changing end shield length 511. As such, the selection of bearing cap 518 is a function of the bearing cap length 520 varying in a reverse proportional distance to any width variation associated with the different widths of the selected stator core. As one example, Table 1 illustrates one such relationship.

TABLE 1

| Motor Ver. | Stator Core | Stator Core Width | Bearing Cap | Bearing Cap Length Adjmt | Combined Length Std |
|---|---|---|---|---|---|
| 1 | $SC_A$ | 0.875 | $BC_1$ | 0.487 | 1.362 |
| 2 | $SC_B$ | 0.938 | $BC_2$ | 0.424 | 1.362 |
| 3 | $SC_C$ | 1.000 | $BC_3$ | 0.362 | 1.362 |
| 4 | $SC_D$ | 1.125 | $BC_4$ | 0.237 | 1.362 |
| 5 | $SC_E$ | 1.250 | $BC_5$ | 0.112 | 1.362 |

In this example, there is five stator cores 502 having different stator core widths ranging from 0.875 inches to 1.250 inches. In order for motor assembly 500 to comply with the hub-to-hub distance requirement of a particular application, a bearing cap 518 is selected from a plurality of bearing caps 518 having a variety of bearing cap length adjustments. In this example, the sum of the length of the stator core and the bearing cap must equal the combined length standard, which in this example is 1.362 inches. This distance is a function of the various other component distances of motor assembly 500 and the required hub-to-hub length for the particular application for which motor assembly 500 is intended. As one example, in Table 1 if stator core $SC_D$ is required or selected, for an application requiring a 1.362 inch combined length, bearing cap $BC_4$ is selected since bearing cap length of 0.237 provides the requisite bearing cap length 520 for the particular combined length standard.

Referring again to FIG. 5, bearing cap 518 may be configured to couple to a mounting arrangement or a hub ring 528 that may provide for assembly or attachment of motor assembly 500 in a particular motor application. As illustrated, bearing cap 518 may be configured such that hub ring 528 is coupled about an exterior face or surface of bearing cap 518. Motor assembly 500 may also include a bearing cap cover 530. Bearing cap cover 530 may be configured for coupling to bearing cap 518 and about shaft 512. Such coupling may be any form of coupling including press fitting, gluing, screwing, welding, etc. When so configured, bearing cap cover 530 may provide for a closure of bearing cap inner chamber 521. In one embodiment, bearing cap cover 530, bearing cap 518 and hub ring 528 may be configured such that bearing cap cover 530 engages or secures hub ring 528 when bearing cap cover 530 is coupled to bearing cap 518.

FIG. 5 also illustrates further embodiments that may include various additional optional features and components. Motor assembly 500 may also include a second end shield 532 coupled to second stator core surface 508 in one of the methods discussed above with regard to end shield 510. Second end shield 532 has a second end shield length 534. A second bearing cap 536 may also optionally be coupled to second end shield 532 in one or more of the manners as discussed above with regard to bearing cap 518. Second bearing cap 536 has a second bearing cap length 538. Second bearing 536 may include a second bearing cap inner chamber 537. A second bearing 542 may be located within second inner chamber 537 and about shaft 512. A second bearing retainer 544 may also be located within second inner chamber 537 and positioned to retain or secure at least a portion of second bearing 542. Second bearing cap 536 may be configured for coupling to a second hub ring 546. Second hub ring 546 may provide for further attachment or mounting of motor assembly 500 in a particular motor application. A second bearing cap cover 548 may be coupled to second bearing cap 536 and about shaft 512. Second bearing cap cover 548 may also engage second hub ring 546 and may at least partially enclose second inner chamber 537. In one optional embodiment, a lubricant 550 may be enclosed, at least in part, within second inner chamber 537 or within inner chamber 521.

In one embodiment, second end shield 532, second bearing cap 536, second bearing cap cover 548, second hub ring 546, second bearing 542, and second bearing retainer 544 may be different than end shield 510, bearing cap 518, bearing cap cover 530, hub ring 528, bearing 522, and bearing retainer 524, respectively. However, in some embodiments, one or more of the optional second components, second end shield 532, second bearing cap 536, second bearing cap cover 548, second hub ring 546, second bearing 542, and second bearing retainer 544, may be the same, interchangeable with, or similar to the previously identified respective components, end shield 510, bearing cap 518, bearing cap cover 530, hub ring 528, bearing 522, and bearing retainer 524.

In one embodiment, motor assembly 500 may be assembled to have a hub-to-hub length 540. Hub-to-hub length 540 may include, among other elements or components, the stator core length 504, end shield length 511, second end shield length 534, bearing cap length 520, and second bearing cap length 538. In a preferred embodiment, motor assembly 500 is assembled from among a plurality of stator cores 502 having different stator core lengths 504. End shield 510 and second end shield 532 have single designs and single lengths, end shield length 520 and second end shield length 534, respectively. As in some embodiments, hub-to-hub length 540 for motor assembly 500 is predetermined by a particular application for motor assembly 500, one or both of bearing cap 518 and second bearing cap 536 may be selected to provide for width variations of a selected one of the plurality of stator cores 502.

In another embodiment, the selection of one or both of one of a plurality of bearing caps 518 having different bearing cap lengths 520 and one of a plurality of second bearing caps 536 having different second bearing cap lengths 538 may be a function of adapting motor assembly 500 to a plurality of different hub-to-hub lengths 540. In this embodiment, the stator core width 504 may not vary. However, a different application for motor assembly 500 may require a different hub-to-hub length 540 for the motor. In order to adapt the hub-to-hub length 540, one or both of bearing cap 518 and second bearing cap 536 may be selected from a plurality of bearing caps having different bearing cap lengths. Such selection provides for assembly of motor assembly 500 with the desired hub-to-hub length 540.

Figure 6:
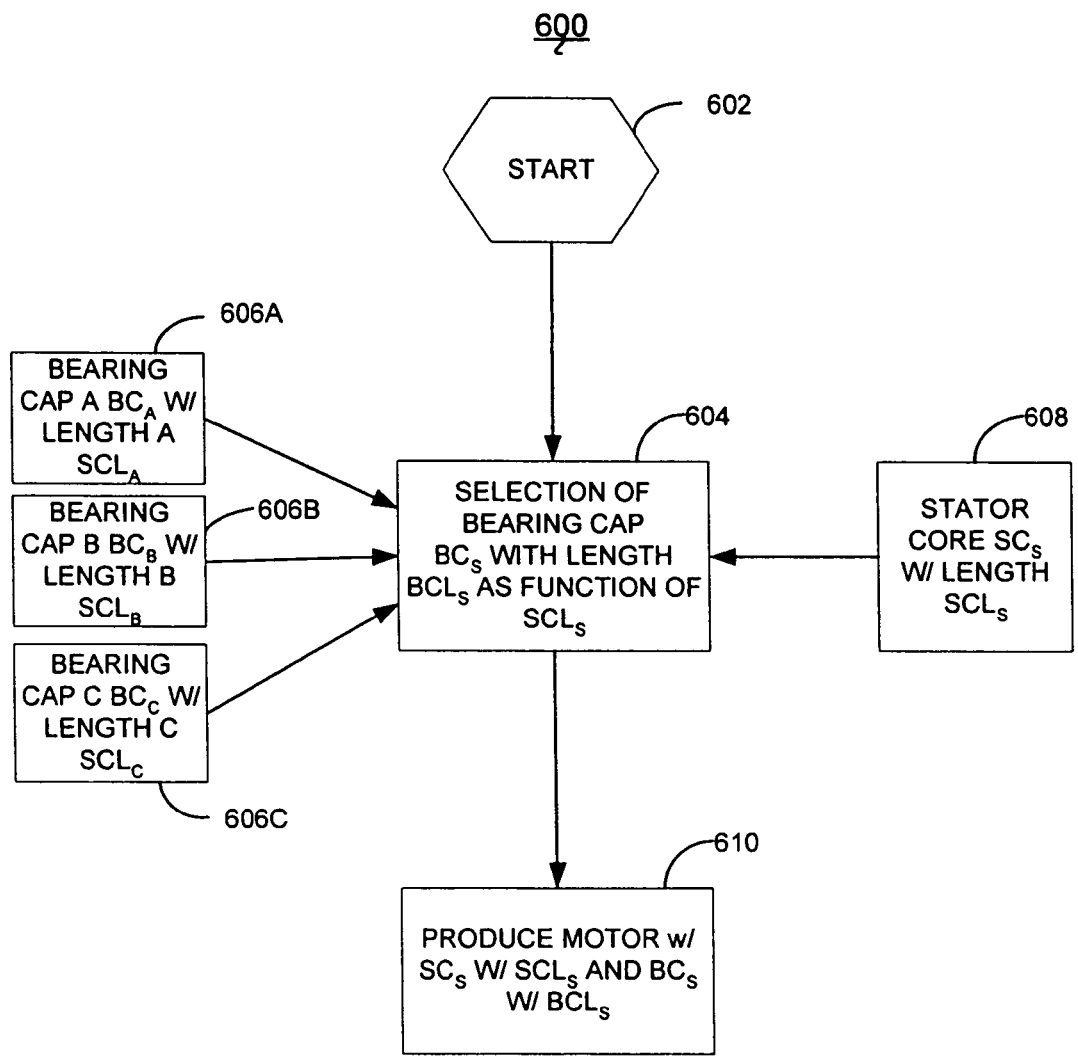
FIG. 6 is a flow chart illustrating a method of producing a motor according to one implementation of the invention.

One method of producing a motor according to one implementation of the invention is illustrated in FIG. 6. Generally, motor production method 600 begins at operation 602. In bearing cap selection operation 604, one of a plurality of bearing caps is selected as a function of a length of a selected stator core and the length of the selected bearing cap. The plurality of bearing caps is illustrated in FIG. 6 in blocks 606A–C by three bearing caps, $BC_A$, $BC_B$, and $BC_C$, each having a different bearing cap length, $BCL_A$, $BCL_B$, and $BCL_C$, respectively. The length of each of plurality of bearing caps is provided to bearing cap selection operation 604. Also provided to operation 604 is length $SCL_S$ of a selected stator core $SC_S$. After one of the plurality of bearing caps $BC_A$, $BC_B$, and $BC_C$ is chosen as the selected bearing cap $BC_S$ with selected bearing cap length $BCL_S$, the motor is assembled in motor assembly operation 610 utilizing $SC_S$ and $BC_S$. This may include attachment of an end shield to the selected stator core $SC_S$ and attachment of the selected bearing cap $BC_S$ to the end shield. In optional embodiments, an inner portion of the selected bearing cap may be press fitted to an outer portion of a first end shield. Optionally, one or more tabs of the end shield or bearing cap may secure or engage the bearing cap to the end shield.

In other implementations, two or more bearing caps may be selected in selection operation 604 as a function of the two lengths of the bearing caps in combination with the selected stator core length $SC_S$. One or both bearing caps may have an internal surface. In such an embodiment, the production methods may include press fitting a bearing cap cover to the internal surface of the selected bearing cap. The bearing cap cover may also engage, retain or aid in coupling a hub ring to a portion of the bearing cap.

Other production operations may include selecting the stator core from one of a plurality of stator cores, each of the plurality of stator cores having a different stator core width. Other production operations may include attaching a first end shield to the stator core, and attaching the selected bearing cap to the first end shield. Additionally, the implementation may include attaching a second end shield to the stator core on an opposing side of the stator core from the first end shield. Optionally, the method may also include coupling a second bearing cap to the second end shield. In such an implementation, the two end shields, bearing caps, and stator core may provide a predetermined hub-to-hub length for the motor.

In alternative methods where the selected bearing cap has an internal chamber, a bearing may be mounted in the bearing cap internal chamber and about a shaft. Further, a bearing retainer may be positioned in the bearing cap internal chamber and compressed between the end shield and the selected bearing cap to couple to the bearing. In some embodiments, the internal chamber of the bearing cap may, at least in part, be filled with a bearing lubricant.

Other variations of the implementation illustrated in FIG. 6 may include bearing cap selection in operation 604 that is a function of a predetermined combined stator core width and the length of one or more bearing caps. In other embodiments, selection operation 604 may be a function of a predetermined hub-to-hub motor length.

Figure 7:
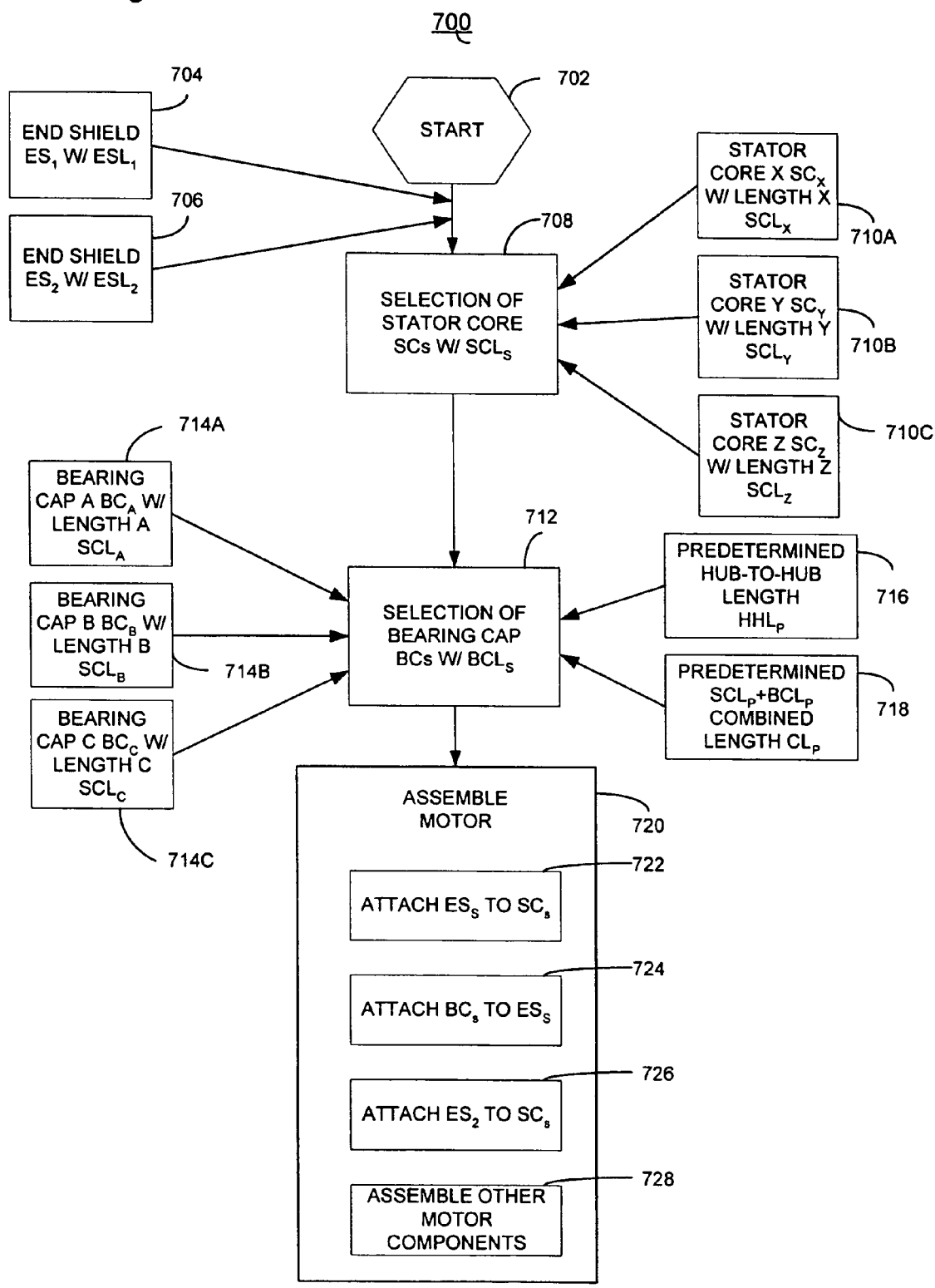
FIG. 7 is a flow chart illustrating a method of producing a motor according to another implementation of the invention.

Another implementation of a method of producing a motor is illustrated in FIG. 7. In this implementation of a method of producing a motor 700, a stator core is also selected from a plurality of stator cores, each of which has a different stator core width. Method of producing a motor 700 starts in operation 702 wherein a first end shield $ES_1$ with a first end shield length $ESL_1$ is provided in block 704 and optionally a second end shield $ES_2$ with a second end shield length $ESL_2$ is provided in block 706. A stator core selection operation 708 selects one of a plurality of stator cores, as illustrated by example by blocks 710A–C as stators cores $SC_X$, $SC_Y$, and $SC_Z$. Each of the plurality of stator cores has a different stator core length as indicated in blocks 710A–C as $SCL_X$, $SCL_Y$, and $SCL_Z$, respectively. Selected stator core $SC_S$ is selected as a function of one or more desired or required motor characteristics such as power or torque. The selected stator core $SC_S$ has a related stator core length $SCL_S$.

Once the selected stator core $SC_S$ is selected and the stator core length $SCL_S$ is known, a bearing cap selection operation 712 selects one of a plurality of bearing caps as a function of the selected stator core length $SCL_S$. The plurality of bearing caps are illustrated, by example, in blocks 714—A–C as $BC_A$, $BC_B$, $BC_C$, each of which has a different bearing cap length, $BCL_A$, $SCL_B$, and $BCL_C$, respectively. The selection process selects the bearing cap also as a function of the length of each particular bearing cap in the plurality of bearing caps. Once bearing cap selection operation 712 selects a selected bearing cap $BC_S$, the motor is assembled in motor assembly operation 720. Motor assembly operation 720 assembles the motor utilizing selected stator core $SC_S$ and selected bearing cap $BC_S$.

In an optional embodiment, bearing cap selection operation 712 may select bearing cap $SC_S$ also as a function of a predetermined hub-to-hub length $HHL_P$ for the motor as in block 716. In another embodiment, bearing cap selection operation 712 may select bearing cap $SC_S$ also as a function of a predetermined combined length $CL_P$ of a bearing cap and a stator core as in block 718.

In some embodiment, motor assembly operation 720 may include an operation of attaching a selected end shield $ES_S$ to the selected stator core $SC_S$ as in block 722. Also, this may include attaching the selected bearing cap $BC_S$ to the selected end shield $ES_S$. This may also include attaching a second end shield $ES_2$ to an opposing side of the selected stator core $SC_S$. Operations related to assembly of other components, as are discussed above and or known in the art, are illustrated in operational block 728.

It should be understood that when introducing aspects of the invention or various embodiments or implementations thereof, the articles "a", "an", "the", and "said" are intended to mean that there are one or more of the elements. The terms "comprising", "including", and "having" are intended to be inclusive and mean that there may be additional elements or aspects other than the listed elements or aspects.

It is further understood that the steps or operations described herein are not to be construed as necessarily requiring their performance in the particular order discussed or illustrated. It is also to be understood that additional or alternative steps or operations may be employed.

As various changes could be made in the above exemplary constructions and methods without departing from the scope of the invention, it is intended that all matter contained in the above description or shown in the accompanying drawings shall be interpreted as illustrative and not in a limiting sense.

What is claimed is:

1. A method of producing a motor having a stator core and at least a first end shield, the method comprising selecting a bearing cap from one of a plurality of bearing caps, each of the plurality of bearing caps having a different bearing cap length and being dimensioned for attachment to the first end shield, said selecting including selecting one of the plurality of bearing caps as a function of a width of said stator core.

2. The method of claim 1, further comprising selecting the stator core from one of a plurality of stator cores, each of the plurality of stator cores having a different stator core width.

3. The method of claim 1 including selecting one of the plurality of bearing caps so as to provide the combination of the bearing cap and stator core with a predetermined combined length.

4. The method of claim 1 including selecting one of the plurality of bearing caps so as to provide a predetermined hub-to-hub length for said motor.

5. The method of claim 1, further comprising:
attaching the first end shield to the stator core;
attaching the selected bearing cap to the first end shield;
attaching a second end shield to the stator core, wherein the first and second end shields are attached to opposing sides of the stator core, said method providing a predetermined hub-to-hub length for said motor.

6. The method of claim 5, further comprising coupling a second bearing cap to the second end shield.

7. The method of claim 1, further comprising:
press fitting an inner portion of the selected bearing cap to an outer portion of the first end shield; and
securing a tab of the selected bearing cap to engage a portion of the first end shield.

8. The method of claim 1 wherein the selected bearing cap has an internal chamber, further comprising:
mounting a bearing in the bearing cap internal chamber and about a shaft;
positioning a bearing retainer in the bearing cap internal chamber, said bearing retainer being compressed between the first end shield and the selected bearing cap to couple to the bearing; and
filling at least a portion of the bearing cap internal chamber with a bearing lubricant.

9. The method of claim 1 wherein the bearing cap has an internal surface, further comprising press fitting a bearing cap cover to the internal surface of the selected bearing cap, wherein the bearing cap cover couples a hub ring to a portion of the selected bearing cap when attached.

10. A method of assembling a motor comprising:
selecting a stator core from one of a plurality of stator cores, each of the plurality of stator cores having a different stator core width;
attaching a first end shield and a second end shield to opposing sides of the selected stator core;
selecting a first bearing cap from a plurality of bearing caps, each of the plurality of bearing caps having a different bearing cap length and being dimensioned for attachment to the first end shield, said selecting a first bearing cap includes selecting as a function of a width of the selected stator core; and
attaching the first bearing cap to the first end shield to provide the motor with a predetermined hub-to-hub length.

11. The method of claim 10 wherein attaching the first bearing cap includes press fitting an inner portion of the first bearing cap to an outer portion of the first end shield, and securing a tab of the first bearing cap to engage a portion of the first end shield.

12. The method of claim 10, further comprising attaching a second bearing cap to the second end shield, said attaching includes press fitting an inner portion of the second bearing cap to an outer portion of the second end shield, and securing a tab of the second bearing cap to engage a portion of the second end shield.

13. The method of claim 10 wherein the bearing cap has an internal chamber, further comprising:
mounting a first bearing within the first bearing cap chamber, said first bearing being about a shaft of the motor;
positioning a first bearing retainer within the first bearing cap chamber, said first bearing retainer being compressed between the first end shield and the first bearing cap to secure the first bearing; and
filling at least a portion of the first bearing cap with a bearing lubricant.

14. The method of claim 10, further comprising press fitting a bearing cap cover to an inner surface of the first bearing cap, wherein the bearing cap cover couples a hub ring to a portion of the bearing cap when attached.

* * * * *